United States Patent [19]

Koslow

[11] Patent Number: 4,643,852
[45] Date of Patent: Feb. 17, 1987

[54] ENERGY EFFICIENT PHASE TRANSFER/DISPERSION SYSTEMS AND METHODS FOR USING THE SAME

[76] Inventor: Evan E. Koslow, 5 Town Crier La., Westport, Conn. 06880

[21] Appl. No.: 814,657

[22] Filed: Dec. 30, 1985

Related U.S. Application Data

[63] Continuation-in-part of Ser. No. 253,594, Apr. 13, 1981, abandoned.

[51] Int. Cl.$^4$ .............................................. B01F 3/04
[52] U.S. Cl. .................... 261/93; 209/170; 210/703; 210/219; 210/221.2; 261/DIG. 7; 366/102; 422/231
[58] Field of Search .................. 261/87, 93, DIG. 26, 261/DIG. 7; 99/323.1; 210/703-707, 219, 220, 221.1, 221.2; 209/169, 170; 435/313, 315; 366/279, 102, 107; 55/95, 256; 252/351; 422/225, 231

[56] References Cited

U.S. PATENT DOCUMENTS

| | | | |
|---|---|---|---|
| 2,515,538 | 7/1950 | Wall | 261/93 X |
| 2,996,287 | 8/1961 | Audran | 261/87 X |
| 3,650,513 | 3/1972 | Werner | 261/87 |
| 3,953,552 | 4/1976 | Strauss | 261/93 |
| 4,066,722 | 1/1978 | Pietruszewski et al. | 261/87 |
| 4,228,112 | 10/1980 | Hise | 261/87 |

FOREIGN PATENT DOCUMENTS 532950 3/1973 Switzerland ......................... 261/87

*Primary Examiner*—Richard L. Chiesa
*Attorney, Agent, or Firm*—Parmelee, Bollinger & Bramblett

[57] ABSTRACT

The present invention provides an apparatus for generating gas bubbles in a liquid. The bubbles, which are uniform in size and on the order of approximately 100 micrometers in diameter or less, enhance the efficiency of gas transfer to the liquid. The apparatus includes at least one rotatable member, in the shape of a disc or ring, which is wettable by the liquid and rotatable therein at an edge velocity of at least 70 feet per second. The upper surface of the rotatable member is parallel to, and spaced from, a stationary plate to form a shear zone. Gas, or some other fluid, is supplied proximate the upper surface of the rotatable circular member to form the bubbles. Optimized relationships between the radius of the disc or ring and its speed of rotation are disclosed to enhance the efficiency of operation of the apparatus. The apparatus can be used in various applications in which it is desirable to disperse a gas or other fluid into a liquid as, for example, aeration to promote the decomposition of biological waste products or the carbonation of soft drinks.

12 Claims, 10 Drawing Figures

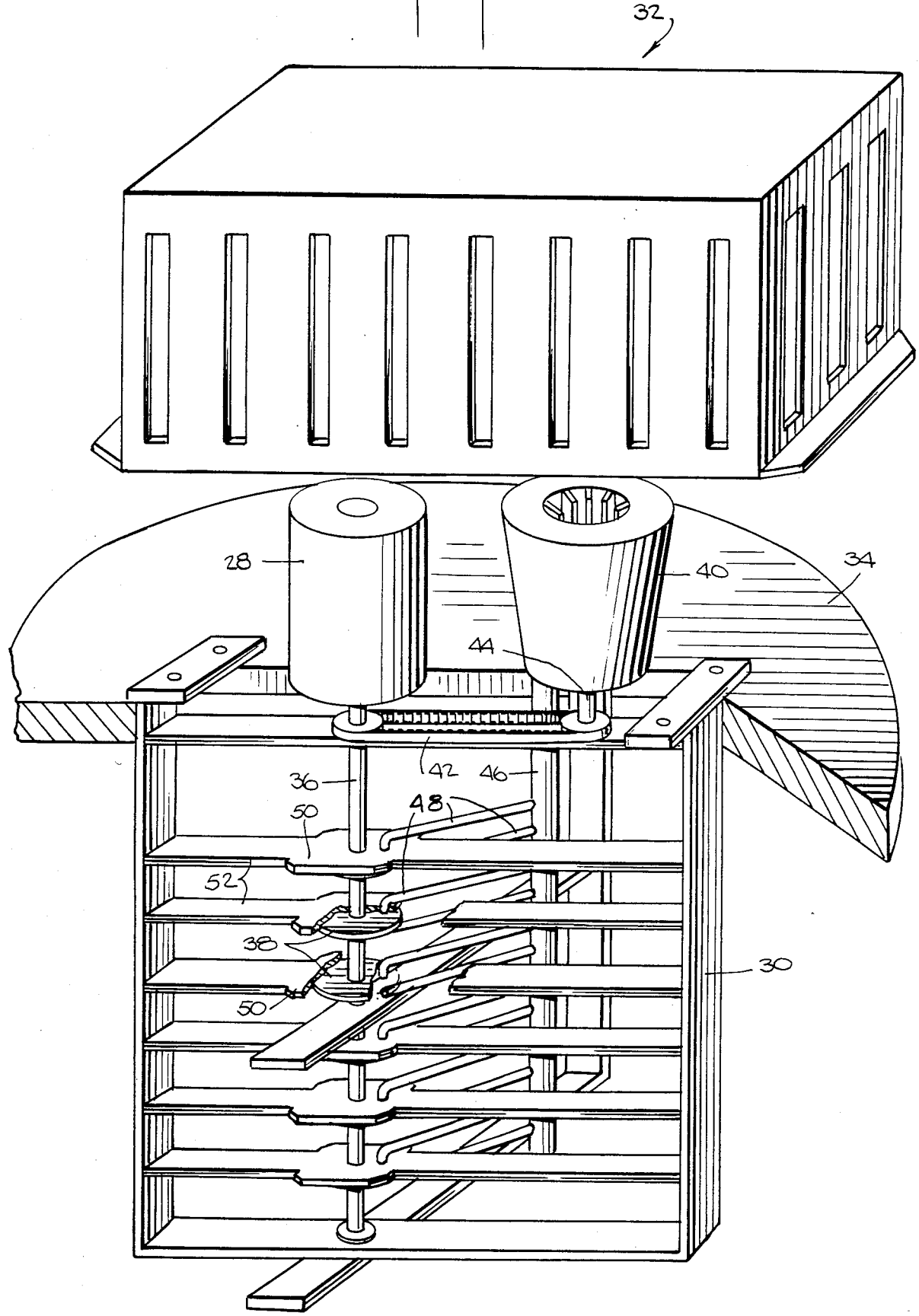

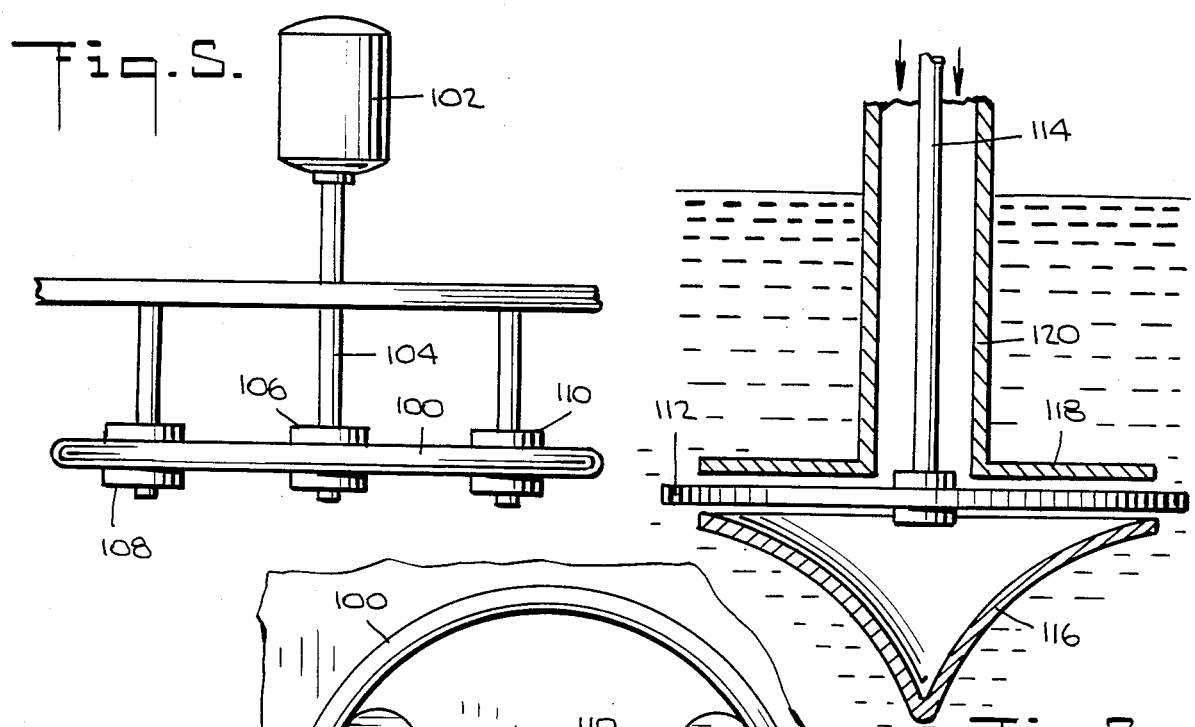
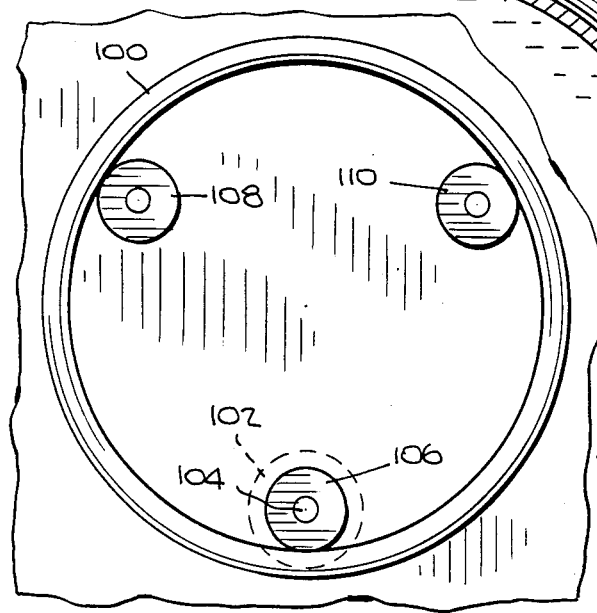
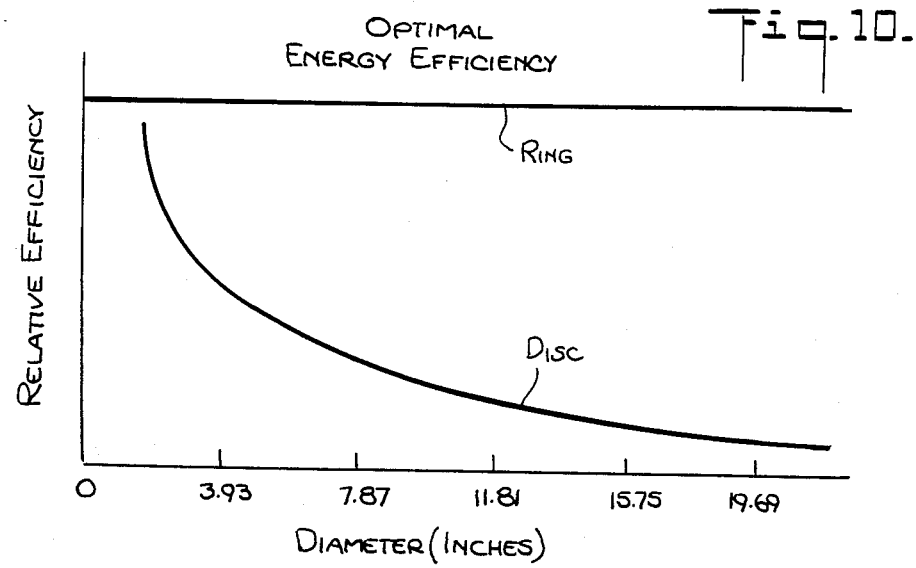

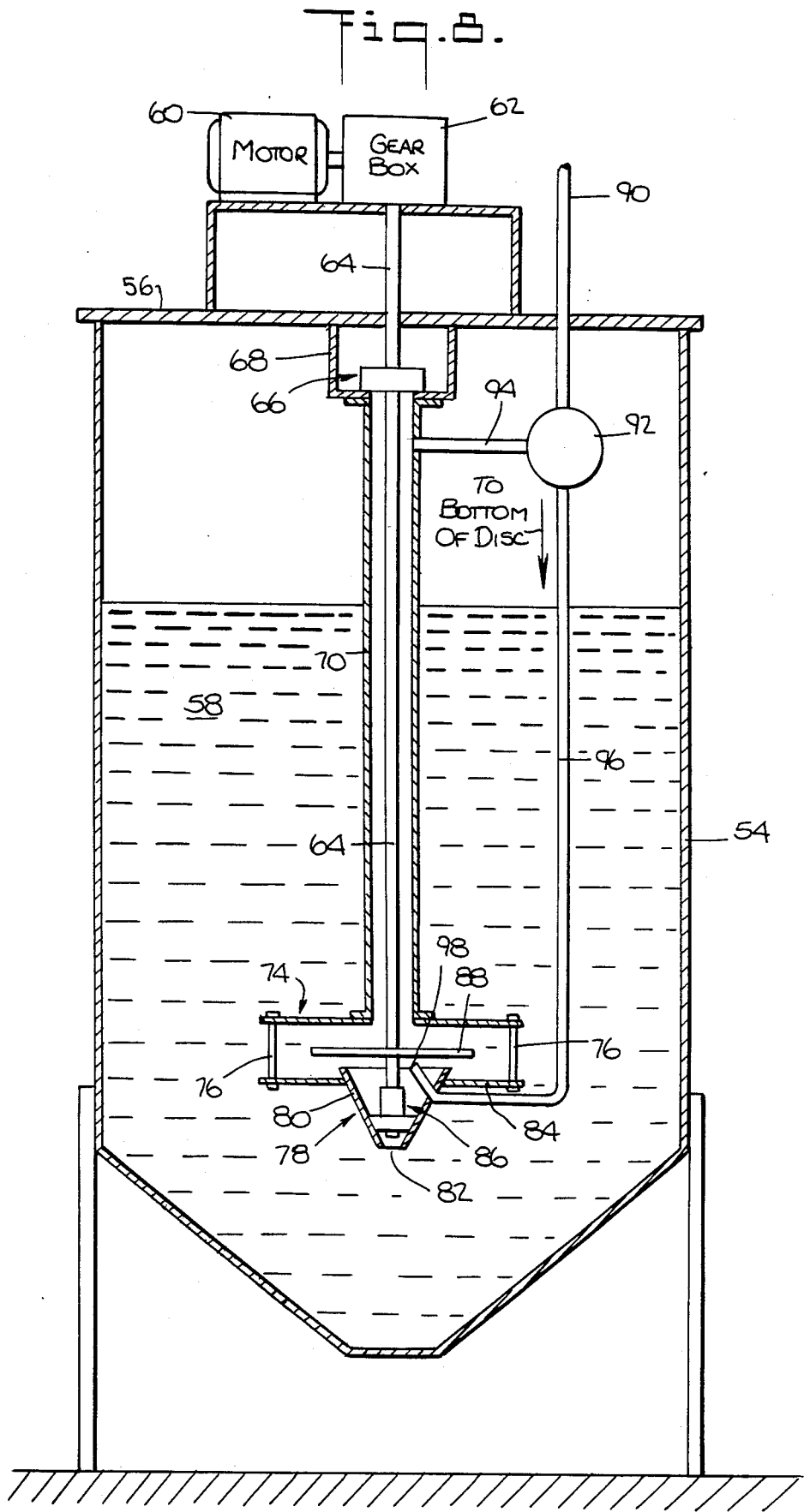

ENERGY EFFICIENT PHASE TRANSFER/DISPERSION SYSTEMS AND METHODS FOR USING THE SAME

This application is a continuation-in-part of my co-pending application Ser. No. 253,594, filed Apr. 13, 1981 for Energy Efficient Phase Transfer/Dispersion Systems and Methods for Using the Same, now abandoned.

BACKGROUND OF THE INVENTION

A. Field of the Invention

The present invention relates to methods and apparatus for dispersing a fluid into a liquid for the purpose of promoting phase transfer into the liquid. The present invention performs this with high energy efficiency and with greatly improved phase transfer efficiency. The present invention also relates to the production and use of small gas bubbles for purposes other than gas transfer as, for example, the separation of solids from liquid by flotation.

B. Description of the Prior Art

Aeration is the largest energy consumer of the presently used techniques for controlling water pollution. Aerators are extensively used to maintain aerobic conditions for sewage digestion and a host of other biological waste treatment processes. Aeration equipment is often employed to provide mixing in biological reactors and to prevent the settling of solids. A conventional aerator is usually of high capacity (10–100 horsepower) and includes a large, finned, rotating turbine whose diameter might range from 20–60 inches (50–150 centimeters). Such units usually have efficiencies of about 1.5–1.7 pounds of oxygen transferred for each horsepower hour of energy expended. A typical 25 horsepower aerator might transfer about 1000 lbs. of oxygen each day into the surrounding liquid. A more elaborate approach involves forcing the gas, sometimes pure oxygen, through a porous disc immersed in the liquid, creating an exhaust of fine bubbles.

Several advanced aerators have been developed which include specially shaped and finned turbines of smaller size than the conventional rotors mentioned above. Another type incorporates a larger rotor operating close to a stator with air sheared in the space defined between the two opposing pieces of metal. Such aerators have achieved up to about 2.65 lbs. oxygen transferred per horsepower hour, or roughly 65% better energy efficiency than conventional aerators.

The capital cost of aeration equipment is related to the size of the motor used because the motor is the major cost component in most systems. The other major costs are for the installation of the unit and for the supply of electrical power. Any major change in the efficiency of an aerator produces not only operating cost savings by reducing energy consumption during treatment but also substantially decreases capital costs for the equipment by reducing the size of the motor required for a given amount of aeration capacity. An aerator with a two-fold increase in efficiency and a design similar to that of a conventional aerator, would reduce operating costs by almost 40% and capital costs for the system by a factor of 30%.

The major aim in most systems of conventional design is to maximize turbulence (surface aerators) and increase the interfacial surface area between the liquid and gas (assumed to be air or oxygen in most cases). Advanced aerators usually are designed to produce small bubbles as they have large surface areas and slow rise velocities. Such small bubbles remain in contact with the fluid for a long period of time and greatly improve gas to liquid transfer. Generating small bubbles, rather than promoting surface turbulence, is a better approach to more efficient aeration. Small bubbles can also be used for flotation (solid/liquid separation), protein extraction by the concentrating of surface-active solutes in the bubble membrane, or for density-dependent separation. Accordingly, an efficient small-bubble generator could be applied to many uses. However, the energy costs of most small-bubble generators prove prohibitive. It is an object of the present invention to provide an energy efficient small-bubble generator.

SUMMARY OF THE INVENTION

The present invention provides an energy efficient apparatus for generating small bubbles with high interfacial surface areas in a liquid medium to enhance the transfer of components from the gas phase into the liquid. The apparatus includes a wettable rotatable member, such as a disc or ring, and means for rotating the member within the liquid to provide an edge velocity of 70 feet per second or greater. Means are provided proximate the surfaces of the rotatable member for supplying the gas to be dispersed into small bubbles in the liquid. A stationary plate is spaced from the upper surface to provide a liquid high shear region into which the gas is fed. Optimum relationships between disc or ring size and speed of rotation can be utilized in the apparatus to optimize the rate of phase transfer to the liquid relative to the energy required to operate the apparatus. The apparatus is useful for performing various gas to liquid transfer processes, such as aeration of wastewater for promoting decomposition of biological waste products, production of stable foam products, and carbonation of soft drinks. Also, processes for separation of solids from liquids by flotation resulting from the buoyancy of the small bubbles can be achieved with the apparatus.

BRIEF DESCRIPTION OF THE DRAWINGS

FIG. 4 is a perspective view of a second embodiment of an apparatus for producing gas bubbles in accordance with the present invention;

FIG. 5 is an elevational view of one embodiment of an aerating ring used with the apparatus of FIGS. 1 and 2;

FIG. 6 is a bottom plan view of the aerating ring of FIG. 5;

FIG. 7 is an elevational view, in partial cross section, of an embodiment of an aerating disc used with the apparatus of FIGS. 1 and 2;

FIG. 8 is an elevational view, in partial cross section, of another aerator in accordance with the invention;

FIG. 10 is a graph illustrating the relative efficiencies of similar sized discs and rings showing the greater efficiency of a ring.

DESCRIPTION OF THE PREFERRED EMBODIMENTS

Figure 9:
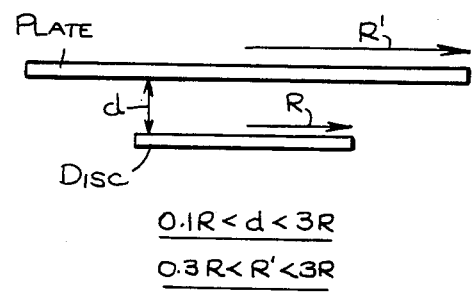
FIG. 9 illustrates relative limiting size relationships between elements of the invention.

A gas bubble contains a certain amount of energy associated with the surface tension of its walls. If a bubble fissions into two bubbles, the total volume remains unchanged, but the total surface area increases. Thus, the process of fissioning requires energy, and the dominant source of energy is kinetic energy in the shear flow of the surrounding liquid. Liquid pressure does work on parts of the bubble, while other parts of the bubble do work on the liquid. The quantity of work done by the liquid on the bubble during the fissioning process is proportional to the bubble volume multiplied by the pressure, and can be expressed by the relationship $$\text{Work in } \alpha \ r_b{}^5 S^2 d$$

where $r_b$ is the bubble radius, S is the shear flow, and d is the liquid density.

The work done by the bubble on the liquid can be expressed as $$\text{Work out} = r_b{}^2 \sigma 4\pi(2^{\frac{1}{2}} - 1)$$

where $r_b$ is the bubble radius and $\sigma$ is the surface tension of the bubble.

Because the fission process is reversible, the work in must equal the work out. Thus, for a given shear flow, bubbles will shear until they come to an equilibrium radius determined by:

$$r_b{}^3 S^2 d/\sigma = \text{constant,}$$

in which the constant is the Weber number, W, of the system. Accordingly, it has been determined that the smallest bubbles are produced by the flows of highest shear. For a planar rotating member of radius R spinning at $\Omega$ RPM, the bubbles produced have a radius of:

$$r_b = 6.613 \ (R\Omega)^{-\frac{2}{3}}$$

where $r_b$ and R are given in centimeters, and the rotating member is generally wetted by the surrounding liquid, either because of the presence of wetting agents in the liquid (surfactants) or because of the natural wettability of the rotating object by the surrounding fluid. The bubble size remains large until the surface is made to wet effectively. I have discovered that wettability of the rotating surface is very important. "Wettability" is the force of adhesion between the rotating member and the liquid. When the force is high, liquid adjacent the member is "dragged" along by it in an outwardly spiraling path due to rotational and centrifugal forces. This creates shear planes in the liquid. When a parallel, stationary, surface is closely adjacent, the effect is magnified. Without wetting, the device is generally incapable of producing the very small bubbles which are desired.

It has further been empirically determined that the efficiency of dissolved gas transfer to a liquid is, in many cases, approximately inversely linearly related to bubble radius for gas bubbles less than about 75 micrometers in diameter. That is, the transfer efficiency (TE) linearly decreases as the size of the bubble increases according to the relationship:

$$TE = 1 - k \ r_b$$

where k is a constant.

Thus, the efficiency of small bubble generators is related to the bubble size. The smaller the bubbles produced (and thus the greater the interfacial surface area between the liquid and the gas), the more efficient is the gas transfer from the bubble to the liquid.

The amount of gas that can pass through the shear field created by a rotating disc or ring at steady state is:

$$Q_{max} \ (\text{ml/min}) = 8\pi^2 R^2 \Omega \ r_b$$

where R and $r_b$ are in centimeters. The total amount of gas transferred is:

$$Q_{max} \ (TE)$$

However, it has been further determined and experimentally confirmed that the power required to rotate a disc in a viscous medium rapidly increases with increasing disc size and speed of rotation according to the equation:

$$HP = 2.59 \times 10^{-13} R^4 \ \Omega \ 5/2$$

where HP is shaft horsepower required to drive the disc. The result is that small, efficient spinning disc aerators will not scale up to large efficient aerators because energy consumption increases rapidly with increasing disc size but aeration capacity does not. As noted above, shear flow is the factor that determines bubble size. The shear flow at the edges of larger and smaller rotating discs will be the same provided the edge velocities are equivalent. However, the larger disc has a larger rotating surface which increases th viscous drag upon that disc, reducing its efficiency (see FIG. 10).

In addition, while turbine blades, fins, and other propeller-like additions to the rotating body increase mixing, they further increase the amount of energy required to rotate the disc. Such modifications tend to reduce the overall efficiency of gas transfer and are undesirable.

As will be discussed below, one solution to the above problem is to provide a bubble generator including a plurality of small rotatable discs. A second solution to the problem is to provide a bubble generator utilizing rotatable rings, not discs. Rings, which do not have large rotating centers, do not exhibit as rapid an increase in viscous drag as rotating discs of corresponding dimensions. In fact, the energy required to rotate a ring is given as:

$$HP(ring) = R^3 \ \Omega^2 \ (6.67 \times 10^{-11})$$

Accordingly, a smaller, efficient ring aerator may be scaled into a larger ring that remains highly efficient.

The optimization of disc parameters to achieve optimum efficiency of a disc aerator has been both analytically and empirically determined to be:

$$\Omega = 31239/R,$$

where R = disc radius in centimeters and $\Omega$ = RPM. The above relation results in an optimization of the device energy efficiency as a function of disc radius given as $$F = P/\sqrt{R},$$

where F is the ratio of the Dissolved Oxygen Transfer Rate (DOTR) divided by the amount of power consumed to rotate the disc and P is a constant. Simply stated, the efficiency of a disc aerator decreases as the radius of the disc increases. The gas bubbles produced by the optimized disc parameters are on the order of $r_b = 0.0067$ cm., where $r_b =$ bubble radius.

Likewise, optimized ring parameters have been determined as follows:

$$RPM = 41067/R.$$

F = constant; and
$r_b = 0.00556$ cm.

When the above optimization equations are differentiated to determine the conditions for optimum fluid phase transfer, it is determined that an edge velocity of at least approximately 70 feet/second or greater is required.

Note that, in the case of the ring, the energy efficiency, F, remains constant regardless of ring size while this is not true in the case of disc-based devices.

However, the radius of the ring may be increased, and its speed of rotation correspondingly decreased, to conform to the derived optimization criteria without affecting its efficiency because the energy efficiency of ring-shaped devices remains constant regardless of size. To the contrary, increasing the radius of a disc while correspondingly decreasing its speed of rotation to conform to the derived optimization criteria will result in a decline in the efficiency of the system because the energy efficiency of a disc-shaped device is inversely proportional to the square root of its radius. As discussed above, increasing the size of a disc rapidly increases its drag and reduces its overall efficiency. This is not the same with a ring which has an open center and does not create increasing drag with increasing size. The relative efficiencies of similar sized discs and rings are compared in FIG. 10, which will be discussed below. It should be noted that these comparisons assume that the entire disc surface is exposed to liquid drag. It is possible, however, to design a disc apparatus wherein the center of the disc is free of liquid. The disc then becomes a ring for all practical purposes.

It has also been determined that the size of the disc or ring is preferably related to its rotational speed. For example:

R = (K/RPM) for a disc, and,
R = (M/RPM) for a ring,
where
R = disc or ring radius in centimeters,
RPM = speed in revolutions per minute,
K = a constant between 20,000 and 45,000, and,
M = a constant between 25,000 and 55,000.

Also, preferably the fluid phase transfer rate into the liquid medium is:

$$\text{Gas Feed} < N \, \Omega \, R^2 \, r_b,$$

where N is a constant of approximately 0.20,
Gas Feed is in liters/minute,
$\Omega$ = RPM,
R = disc or ring radius, and $r_b$ is bubble radius.

The embodiments of the present invention, to be discussed below, include specific apparatus for generating small bubbles (of the order of 100 micrometers or less in diameter). The apparatus are designed using the theoretical considerations discussed herein to provide energy efficient, high-speed apparatus emphasizing the generation of small bubbles and high interfacial surface area while minimizing turbulence and mixing, to enhance the efficiency of phase transfer and dispersion.

Figure 1:
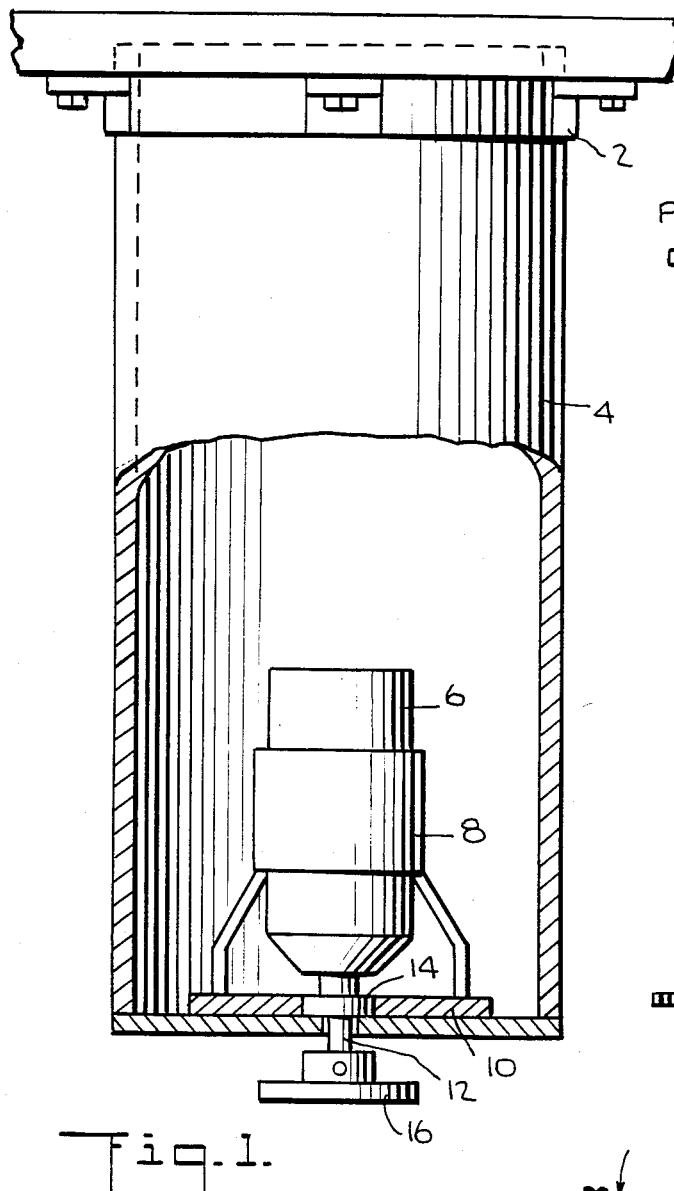
FIG. 1 is an elevational view, in partial cross section, of a first embodiment of an apparatus for producing gas bubbles in accordance with the present invention.

FIG. 1 illustrates a first possible embodiment of an apparatus for generating small gas bubbles in accordance with the present invention. A support collar 2 is mounted to the top of a watertight housing 4. A motor 6 is mounted within the housing on a motor support 8. The motor support is itself supported by a base plate 10 mounted to the inner surface of the bottom of the watertight housing.

A drive shaft 12 extends downwardly from motor 6 through suitable openings provided in the base plate 10 and the lower end of the housing. A gasket 14 seals the opening in the base plate to prevent any lquid from entering the housing.

A rotatable circular disc 16 is affixed to the end of the drive shaft extending outward from the housing. It is spaced slightly below, and parallel to, the bottom of housing 10. Although the rotatable member in FIG. 1 is described as a disc, a ring may also be employed, as will be discussed below. A compressor (not shown) is provided to supply a gas both above and below the disc 16. The rotatable member is generally flat and smooth to inhibit mixing or turbulence of the fluid medium. It does not include blades or fins which promote agitation. The rotatable member is adapted to be wetted by the liquid medium.

In operation, the lower portion of the watertight housing is immersed in the liquid, wetting the rotatable member, and the motor and compressor are actuated. For the reasons discussed above, the motor is rotated at a rate sufficient to provide the disc 16 with an edge velocity of at least 70 feet/second. The shear flow created by the rotating disc results in the dispersion of the gas as small bubbles, resulting in a highly efficient transfer of the gas supplied by the compressor into the liquid medium in which the rotating disc is immersed.

Figure 2:
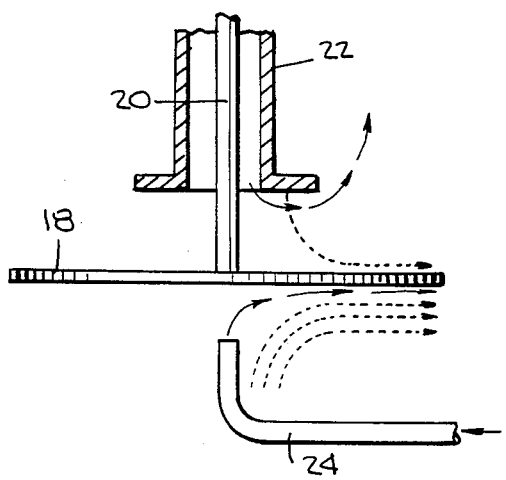
FIG. 2 illustrates one prior art approach to the dispersion of gas into a liquid.
Figure 3:
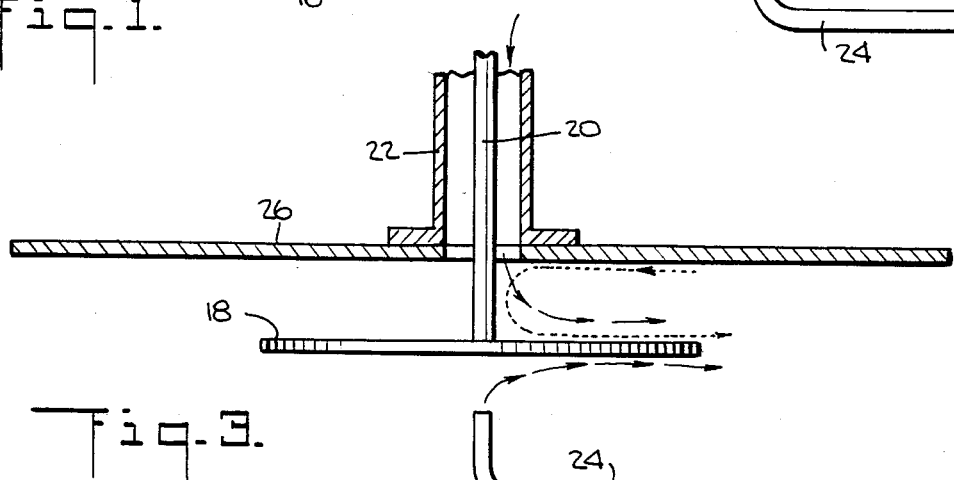
FIG. 3 illustrates the principle employed in the present invention.

FIGS. 2 and 3 illustrate the important distinctions between this invention and certain prior art aerators which employ spinning members. FIG. 2 illustrates a prior art approach wherein a disc 18 is rotated within a liquid by a shaft 20. Air is supplied to the top of disc 18 by an air supply tube 22 surrounding shaft 20 and to the bottom of the disc by a tube 24. As the disc 18 rotates, it tends to throw the liquid layer adjacent its surface outwardly by centrifugal force, while also spinning it circumferentially. Air bubbles rising from tube 24 enter the resulting shear field and are fissioned into smaller bubbles with some degree of efficiency. (Liquid flow is shown by short dashes and gas flow by long dashes.) The air from tube 22, however, is not entrained by the flowing liquid and simply escapes, greatly limiting the aerator's efficiency.

FIG. 3 illustrates the principles of this invention. The structure is almost identical and similar parts are similarly numbered. However, there are two major and important differences: (1) a stationary plate 26 is positioned just above, and parallel to, the disc 18; and (2) disc 18 is wettable by the liquid. The "wettability" of disc 18 (the adhesive force between disc and liquid) increases the liquid shear forces, and thus the efficiency of bubble fissioning, adjacent the disc's lower surface.

The most important improvement, however, occurs in the region between stationary plate 26 and the upper surface of disc 18. The wetted surface of the disc creates a substantial pull on the immediately adjacent liquid layer, for reasons explained supra. This results in a strong, outwardly spiralling, flow adjacent the disc and pulls in a counter flow of liquid adjacent plate 26 as shown by the arrows. This has a twofold result: (1) all the air from tube 22 is entrained into the flowing liquid; and (2) very strong liquid shear forces are established which efficiently fission the entrained air into very small bubbles.

The limiting relationships between plate and disc are as shown in FIG. 9. The distance between them should be greater than 0.1 times disc radius but less than 3 times disc radius. The plate radius should be between 0.3 and 3 times the disc radius.

FIG. 4 of the drawings illustrates a second embodiment in accordance with the present invention including a plurality of rotatable members mounted to a common drive shaft. Specifically, a motor 28 is mounted to the top end of an open-sided supporting frame 30. A cover 32 is removably mounted above the top of the supporting frame to protect the motor. A flotation device 34 is mounted to the supporting frame below the motor to support the structure in a liquid medium.

One end of a drive shaft 36 is coupled to the motor 28 through a suitable opening in the top of the supporting frame 30. The other end of the drive shaft extends through the supporting frame with the lower end of the drive shaft affixed to the lower end of the supporting frame. A plurality of rotatable members 38 are mounted to the drive shaft 36 in stacked relationship. Although the members 38 are illustrated as discs, they may also be rings as will be discussed below.

A compressor or blower 40, mounted to the top end of the supporting frame 30, is driven by the motor 28 via an endless belt 42 connecting the motor drive shaft 36 with a compressor drive shaft 44 extending from the bottom of the compressor. The inlet end of a gas supply manifold 46 is mounted in fluid communication with the compressor, and a plurality of manifold tubes 48 extend from the gas supply manifold. A sufficient number of manifold tubes 48 are provided so that the outlet ends of those tubes supply gas from the compressor both above and below each of the rotatable discs 38. Positioned over each of the discs 38 is a stationary plate 50 carried by a cross-member 52 of frame 30. The upper air supply tube 48a of each pair feeds into the space between a plate 50 and its associated disc 38.

Although the compressor and manifolds of the above apparatus may be omitted by providing a self-aspirating system using a hollow drive shaft 36, this modification is not normally recommended. The relatively large diameter hollow motor drive shaft which would be required for a self-aspirating system is not compatible with the relatively small diameter discs necessary to the efficiency of the rotating disc apparatus.

Also, although the means for rotating the shaft is shown as a motor, it is within the scope of the present invention for the rotatable member to be the rotor of an induction motor surrounded by stator coils or other electromagnetic induction means.

In operation, the support frame 30 is immersed in a liquid medium up to the level of the flotation device 34. The motor 28 rotates at a speed sufficient to obtain disc edge velocities required to obtain near optimum performance, namely, 70 feet/second or greater. The resulting apparatus provides a highly efficient transfer of gas supplied by the compressor to the liquid medium, in accordance with the optimization equations discussed above.

FIG. 8 illustrates a version of the aerator of this invention housed within a free-standing tank 54 closed by a cover 56 and containing a liquid 58. Mounted atop the cover 56 is a motor 60, which drives a gear box 62. A drive shaft 64 depends from the gear box 62 and through the cover 56. It is supported at its upper end by a dry bearing 66 mounted on a bracket 68 above liquid level. Depending from the bracket 68 is an air supply tube 70 which surrounds drive shaft 64 and terminates at a radial flange 72. Mounted to the flange 72 is a horizontally extending flat plate 74. A plurality of bolts 76 depend from the outer periphery of the plate 74 and support a cone assembly 78 in spaced relation from the plate 74. Cone assembly 78 comprises a central truncated cone 80 which has an opening 82 at its apex and a plurality of radially extending wings 84 which are retained by the bolts 76. A wet bearing 86 within the cone 80 supports the lower end of the drive shaft 64. Mounted upon the drive shaft 64 is a horizontal, wettable disc 88 in relatively close proximity to both of the plate 74 and the upper edge of the cone 80.

Air is supplied to both sides of the disc 88 by a supply line 90 from a blower (not shown) which is connected through a balance valve 92. The valve 92 directs a first portion of air through an upper branch line 94 into the air supply tube 70 at its upper end and a second portion through a lower branch line 96 which terminates at a nozzle 98 positioned just below and near the center of disc 88.

The size of the component parts of an aerator such as shown in FIG. 8 is, of course, variable to meet the needs of the user. In one embodiment, however, the disc 88 is of 18" diameter and rotates at 1,000 RPM. The air which enters the air supply tube 70 via upper branch line 94 is supplied to the space between the flat plate 74 and the wettable surface of disc 88. As explained above, the rotating disc positioned below the flat plate 74 creates very high shear forces and creates fine bubbles, as previously explained. The cone 80 provides a radial flow path for water which circulates upwardly through the opening 82 and radially outward through the annular space between the cone upper edge and the bottom surface of the disc 88. It readily entrains air exiting the nozzle 98.

FIGS. 5 and 6 illustrate a ring that may be used as the rotatable member in the embodiments of the invention shown in FIGS. 1, 4, and 8. A rigid ring or flexible loop 100 is driven by a motor 102 via a drive shaft 104. The drive shaft is coupled to a drive pulley 106 located adjacent the inner surface of the ring. Two idler pulleys 108 and 110 are located at different positions adjacent to the inner surface of the ring. The means for providing gas (e.g., the compressor or manifold tubes) supplies gas proximate the open center of the ring. Because the center of the ring has no structural components, no viscous drag is present at the center. Multiple rings can be stacked and driven from a single power source and drive shaft in such a configuration.

FIG. 7 is a partial cross-sectional view of a disc assembly that may be used as the rotatable member in the embodiments of the invention disclosed in FIGS. 1, 4, and 8. The disc 112 is coupled to a motor (not shown) by a drive shaft 114. A conical cowling 116 is positioned below the disc 112 to keep liquid away from its lower surface except at its rim. The fluid media to be dispersed in the surrounding liquid may be supplied through the cowling to the rim of the disc. Because the viscosity of gas (e.g., air) is approximately 1/100 the viscosity of liquid (e.g., water), the cowling 116 tends to eliminate viscous drag on the center of the disc and its lower surface approximates the behavior and performance of a ring-based apparatus. The upper surface is adjacent a flat plate 118 through which a gas is fed by a supply line 120 as previously explained.

The various embodiments of the invention provide apparatus for generating small bubbles which increase the efficiency of phase transfer and dispersion and reduce power consumption. The invention is useful in the following processes in which a gas-to-liquid transfer is required.

1. AERATION: Dispersion of oxygen or air in wastewater for the purpose of promoting the aerobic decomposition of biological waste products.

2. VOLATILIZATION: Related to aeration but designed to remove a volatile component from a fluid. For example, the removal of halocarbon impurities in drinking water.

3. GAS SCRUBBING: The separation of one gaseous component from another by dispersion in an absorbing fluid and selective stripping of gases. A typical example is the removal of carbon dioxide from synthesis gas produced from coal gasification or the removal of sulfur dioxide from fossil-fuel burning power plant stack gas.

4. GAS DISPERSION IN REACTIVE FLUIDS: Gas dispersion into a fluid containing a catalyst or reactant that promotes chemical reactions or changes. For example, the dispersion of synthesis gas from coal gasification into a fluid slurry containing a catalyst that promotes the formation of methane or methanol from the gases. Other examples are dispersion of ethylene and oxygen in a catalytic slurry to produce ethylene oxide gas, dispersion of a monomer into a fluid for the purpose of promoting polymerization, or dispersion of a gas such as hydrogen sulfide to precipitate heavy metals or a gas such as carbon dioxide into a solution of sodium hydroxide to produce sodium carbonate. Another use might involve a small unit to disperse automobile exhaust gases in a catalytic slurry or homogeneous-phase catalyst to reduce exhaust emissions of nitrogen oxides and carbon monoxide.

5. FLOTATION: Production of small bubbles for use in flotation processes where solids are separated from a liquid. Examples might include the separation of sewage sludge from water, the collection of algae from seawater, the removal of lighter coal particles from heavier mineral-containing particles (coal cleaning). As the size of bubbles declines, their attraction for solutes from the surrounding solution and their attraction to solid surfaces increases. This increasing force of attraction soon becomes sufficiently strong that small bubbles are capable of sticking to solid surfaces with sufficient tenacity to overcome the disruptive influence of random fluid shear fields. At this point, the bubbles become attached in a stable manner to small or even large solid bodies floating in the fluid and apply their net buoyancy to "float" the solids to the surface of the fluid body.

6. SURFACE-ACTIVE AGENT RECOVERY: Small bubbles can be used to recover surface-active components from a solution by taking advantage of the tendency for surface-active materials to be concentrated within the membrane of the bubbles. Small bubbles, by virtue of their high surface area and higher rate of curvature, have a greater capacity to remove such materials from solution. Examples include the use of devices like those described herein to produce bubbles that form a foam containing proteins (removed from wastewaters such as potato juice, whey, and milk wastes), or for the recovery of detergents, or colletion of low-level quantities of organic materials from seawater. This is possible because of the formation of an excess surface concentration, C, of surface-active components within the gas-liquid interface. The excess surface concentration, given in mol/m² of surface, can be thermodynamically related to the bulk properties of the fluid as shown by Gibbs.

$$C = - \frac{d\sigma}{RT\, d[\ln(c)]}$$

Where $\sigma$ is the surface tension, c is the concentration of the active component in the bulk fluid, R is the universal gas constant and T the absolute temperature. For large molecules it is especially important to account for the difference between concentration and actual solute activity such that it is more correct to replace c with a measured activity for the proteins or other macromolecules being extracted.

Generally, it can be seen that the surface energy of a very small bubble is considerably higher than for a large bubble. Increasing the surface area of a liquid requires the investment of energy, which remains stored in the enlarged surface, just as energy can be stored in a stretched rubber band, and it can perform work if the enlarged surface is allowed to contract again. Decreasing the surface tension by introducing surface-active solutes to the bulk fluid allows this work to be expended in the form of concentrating these solutes against a concentration gradient. Thus, an excess surface concentration is developed at the gas/liquid membrane and the amount of material collected depends upon the production of copious bubble surface membrane area. Similar reasoning also helps explain why bubbles are attracted to surfaces that can also serve to reduce the interfacial energy of the bubble at the point of contact.

7. PRODUCTION OF STABLE FOAM PRODUCTS: The high shear field systems can be used to produce stable foam products such as foamed-urethane and lightweight closed-cell plastic foams.

8. SOFT-DRINK CARBONATION: The systems described herein can be used to decrease the time required to produce carbonated soft drinks by speeding up the dispersion of carbon dioxide.

9. SEPARATION OF OCEAN BIOMASS: Efficient small bubble production systems can be used to harvest biomass from the ocean. Ozone is mixed with air and supplied to the rotatable member of a bubble generating apparatus, as discussed herein. A plurality of gas bubbles (of the order of size of 50–80 micrometers in diameter) are formed and contacted with water containing the biomass to be harvested. The ozone gas acts to convert the surfaces of the biomass to be harvested into more hydrophobic form. The plurality of bubbles cause the biomass to rise due to the principles discussed above relating to separation of solids from liquids.

It will be apparent that a number of variations and modifications may be made in this invention without departing from its spirit and scope. Accordingly, the foregoing description is to be construed as illustrative

What is claimed is:

1. An apparatus for generating high interfacial surface area in a first, liquid, fluid and for maximizing the dispersal therein of a second fluid comprising:
   at least one rotatable member having generally smooth upper and lower surfaces immersable in said liquid and wettable by said liquid and thereby having a positive wetting adhesive force between the rotatable member and the liquid;
   a relatively stationary member above, and substantially parallel to, the upper surface of said rotatable member to form a volumetric shear zone therebetween;
   means for rotating the rotatable member in the liquid at an edge velocity of at least 70 feet per second, whereby the rotation of the wetted surface of the rotatable member relative to the liquid pumps liquid into and out of the shear zone and creates high shear forces within the shear zone; and
   means for injecting said second fluid into the shear zone whereby bubbles of the second fluid are fissioned by said high shear forces into smaller bubbles which are swept out of the shear zone by the pumped liquid.

2. The apparatus of claim 1 wherein said rotatable member is a disc.

3. The apparatus of claim 1 wherein said rotatable member is a ring.

4. The apparatus of claim 2 or 3 wherein said second fluid is a gas.

5. The apparatus of claim 2 or 3 wherein said fluid is a gas and the means for injecting the gas supply it at a rate substantially limited to:

GAS Feed (liters/minute) $< N \Omega R^2 r_b$ where
N is generally equal to 0.20
$\Omega$ = RPM
R = disc or ring radius, and
$r_b$ is bubble radius.

6. The apparatu of claim 1 additionally comprising:
   means for injecting said second fluid into the liquid adjacent a lower surface of said rotatable member.

7. The apparatus of claim 1 wherein said rotatable member is substantially planar and circular with a radius R and spaced from said stationary member a distance d where $0.1 R < d < 3R$.

8. The apparatus of claim 7 wherein said stationary member has an effective radius R' as measured from a center coaxial with the center of the rotatable member where $0.3 R < R' < 3R$.

9. The apparatus of claim 8 wherein said rotatable member is a disc.

10. The apparatus of claim 8 wherein said rotatable member is a ring.

11. A method of dispersing a fluid into a liquid which comprises:
    creating a shear zone within said liquid between a substantially planar stationary member and a substantially planar circular rotatable member wettable by said liquid and parallel to said stationary member;
    wetting the surface of said rotatable member with said liquid and thereby creating a positive wetting adhesive force between the rotatable member and the liquid;
    rotating said rotatable member at an edge velocity of at least 70 feet per second whereby its wetted surface produces tangential and centrifugal forces on the adjacent liquid with resultant high shear forces and liquid pumping being established in said shear zone; and
    injecting said fluid into said shear zone whereby said fluid is finely dispersed and transported into said liquid.

12. The method of claim 11 wherein said fluid is a gas.

* * * * *